Patented July 1, 1947

2,423,401

UNITED STATES PATENT OFFICE 2,423,401

ALKYLATION OF ISOPARAFFINS

Arlie A. O'Kelly, Woodbury, N. J., Robert H. Work, Philadelphia, Pa., and Julius Plucker, III, Pitman, N. J., assignors to Socony-Vacuum Oil Company, Incorporated, a corporation of New York No Drawing. Application March 16, 1943, Serial No. 479,376

9 Claims. (Cl. 260—683.4)

1

This invention relates to alkylation of branched-chain paraffinic hydrocarbons by olefins and is particularly concerned with a means of directing the reaction to formation of desired branched-chain hydrocarbons with suppression of olefin polymerization which yields by-products of less desirable characteristics.

The primary purpose of such alkylation processes as practiced commercially is the preparation of highly-branched paraffin hydrocarbons boiling in the aviation gasoline range. Such hydrocarbons are produced by the alkylation reaction whereby an olefin is caused to be joined to the tertiary carbon atom of an isoparaffin under the influence of a suitable catalyst in liquid phase or at elevated temperatures. In either case, an important side reaction is polymerization of the olefin reactant since the alkylation conditions—either thermal or catalytic—are favorable to polymerization and thermo-dynamically, the latter reaction is more favored. Suppression of polymerization has heretofore been accomplished to some extent by a large excess of isoparaffin in the charge and in the reaction mixture, but at any concentrations which are commercially feasible, large amounts of polymer are formed. The common practice has been to strike an economic balance between increased costs due to dilution of the charge with isoparaffin and reduced value of the product arising from polymerization.

We have now found a means of suppressing polymerization in the reaction mixture by addition thereto of a suitable agent for that purpose in either catalytic or thermal reactions. This result is accomplished according to a preferred form of the invention by addition of a small amount of a phenol or an aryl amine to the reaction mixture. The action of this novel agent appears to be analogous to the gum inhibiting function of similar substances in cracked gasoline; our work having demonstrated that those compositions which inhibit formation of gum in gasoline during storage are effective for the present purpose. Further, the effectiveness of a substance as a gasoline gum inhibitor is a fairly reliable guide to its beneficial effect in controlling and directing the alkylation reaction. The extent to which the present agents affect the course of the alkylation reaction is quite surprising in view of their relatively mild function in inhibiting formation of gasoline gum. During storage, gasoline is held at normal atmospheric temperature and pressure; any substance which might act as a polymerization catalyst having been removed. The tendency to polymer forma-

2 tion is therefore slight, yet the best known inhibitors are not full protection. On the other hand, the alkylation reaction is practiced only under conditions very favorable to polymerization; i. e., either high temperature and pressure or in the presence of a highly active catalyst. Yet, as will be shown below, agents which are known to reduce gum formation in stored gasoline have very great power to direct the alkylation reaction.

The directing agent of this invention renders effective service in markedly improving the quantity and quality of the yield in alkylation reactions in general. At high temperatures, such as the purely thermal type of process, the agent chosen should be thermally stable at the reaction temperature. Similarly, an agent for use in catalytic reactions should be so chosen that it will not itself, by reason of groups other than those required by the invention, adversely affect the course of the action. Thus, the man skilled in the art would readily recognize that certain substituent groups on a benzene ring of an otherwise suitable agent would be undesirable in the presence of some catalysts. These are criteria common to all chemical agents. Many of the catalysts which are found to be highly suitable for the present purpose, namely, phenol, naphthol, alkylated aryl amines, such as butyl amino phenol, tolylene diamines and the like, are readily available as gum inhibitors for gasoline and may be advantageously employed in the forms marketed for that purpose.

The present agents may be employed with any of the known alkylation catalysts to good effect. For example, alkylation reactions in the presence of sulfuric acid, hydrofluoric acid, phosphoric acid, the metal halide catalysts of the Friedel-Crafts type, such as boron fluoride, aluminum bromide, or aluminum chloride and many other condensing agents give improved yields when the reaction is conducted in the presence of an aryl amine or a phenol. Similarly, thermal reactions of this type are also improved in the presence of the specified directing agents.

EXAMPLE I

Four hundred cc. of concentrated sulfuric acid (approximately 97% $H_2SO_4$) were charged with 400 grams of liquid isobutane and 0.01% of phenol at —12° C. into a vessel fitted with an efficient stirrer and surrounded by a bath of cooling liquid maintained at —1° C. to 12° C. Four hundred grams of di-isobutylene were slowly run into the mixture over a period of one and one-half hours and stirring was continued for a further period of 30 minutes after addition of di-isobutylene was complete. The mixture was allowed to settle and the lower acid layer drawn off. The upper hydrocarbon layer was washed with caustic and distilled. The nature of the yield is given below in Table 1 comparing the yield with that obtained by reaction in the absence of phenol.

EXAMPLE II

Example I was repeated under identical conditions without the addition of phenol. The yield obtained was slightly less than that of Example I, but not sufficiently less to constitute a significant difference in itself. The significant differences appear in Table 1, showing a much larger proportion of higher boiling products and a much higher iodine number in the absence of phenol. It is clear that polymerization is a side reaction of greater importance when the agent of this invention is absent, the reaction yielding products of lesser value.

Table 1

|  | Example I | Example II |
|---|---|---|
| 25–150° C. fraction: |  |  |
| Weight per cent of Yield | 50.7 | 50.7 |
| Iodine number | 0.0 | 5.0 |
| 150–220° C. fraction: |  |  |
| Weight per cent of Yield | 34.8 | 25.7 |
| Iodine number | 4.0 | 24.0 |
| Fraction boiling above 220° C.: |  |  |
| Weight per cent of Yield | 14.5 | 23.6 |
| Iodine number | 70.0 | >100 |

EXAMPLE III

The effectiveness of the present agents in alkylation with Friedel-Crafts type catalyst is illustrated by reaction in the presence of aluminum chloride. An autoclave fitted with a stirrer was charged with 300 grams of isobutane, 80 grams of propylene and 15.2 grams of aluminum chloride. To this reaction mixture was added 0.01% of butyl amino phenols (isomers) as a directing agent. The reaction mixture was cooled and the reaction was continued for a total reaction time of 83 minutes after first introducing olefin. An alkylate yield of 170 grams, or 210% with respect to olefin charged, was obtained upon decomposition of the catalyst and distillation. The characteristics of the alkylate are given in Table 2.

EXAMPLE IV

The process of Example III was repeated in the absence of any directing agent. In this case, the yield was only 120 grams or 150% based on olefin charged. Even more significant differences appear in Table 2 comparing the nature of this alkylate with that of Example III.

EXAMPLE V

The autoclave was charged with 300 grams of isobutane, 92 grams of propylene and 15.7 grams of aluminum chloride. The directing agent used was alpha naphthol and the reaction time was 64 minutes. The yield obtained in this relatively short period was 150 grams or 163% based on olefin. The nature of this alkylate is also given in Table 2.

Table 2

|  | Example III | Example IV | Example V |
|---|---|---|---|
| Weight of alylate fractions: |  |  |  |
| 25–150° C | 115.8 | 33.1 | 60.1 |
| 150–210° C | 20.9 | 20.7 | 24.6 |
| >210° C | 33.3 | 66.2 | 65.3 |
| Per cent of alkylate in fraction: |  |  |  |
| 25–150° C | 68.2 | 27.6 | 40.1 |
| 150–210° C | 12.0 | 17.2 | 16.4 |
| >210° C | 19.8 | 55.2 | 43.5 |

Here, again, is seen the shifting of yield to lower boiling alkylate, as opposed to high-boiling polymers characteristic of the invention. Example V is, of course, not fully comparable to Examples III and IV, being based on a shorter reaction time and a higher proportion of olefin. As is well known, the higher proportions of olefin tend to give larger amounts of polymer. If the product of Example V were merely equivalent to that of Example IV, it would demonstrate a marked and significant improvement by the addition of naphthol. The improved yield is therefore of outstanding importance.

EXAMPLE VI

In a thermal alkylation process, similarly good results are obtained. Alkylation of isobutane with propylene proceeds readily at temperatures upwards of 750° F. and pressures in excess of 1000 pounds per square inch. The addition of small amounts of thermally stable agents of the present type is helpful in reducing the quantity of high-boiling unsaturated polymers produced in such a process. At 800° F. and 2000 pounds per square inch pressure the products from reacting isobutane and propylene in a mol ratio of 4.5 to 1 are greatly improved with respect to saturated hydrocarbons in the gasoline boiling range by charging 0.5% (based on total charge) of tolylene diamines (mixture of isomers).

In general, the concentration of directing agent should be very small, preferably not more than 1% by weight on the total charge of hydrocarbon reactants.

We claim:

1. In a process of synthesizing branched-chain hydrocarbons of high anti-knock rating boiling in the gasoline range by an alkylation reaction between an olefin and a branched-chain paraffin hydrocarbon, the improvement which comprises conducting the alkylation reaction in the presence of a small amount less than 1% by weight based on hydrocarbons charged of an amino phenol.

2. In a process of synthesizing branched-chain hydrocarbons of high anti-knock rating boiling in the gasoline range by an alkylation reaction between an olefin and a branched-chain paraffin hydrocarbon, the improvement which comprises conducting the alkylation reaction in the presence of a small amount less than 1% by weight based on hydrocarbons charged of a phenol.

3. In a process of synthesizing branched-chain hydrocarbons of high anti-knock rating boiling in the gasoline range by an alkylation reaction between an olefin and a branched-chain paraffin hydrocarbon, the improvement which comprises conducting the alkylation reaction in the presence of a small amount less than 1% by weight based on hydrocarbons charged of an alkylated phenol.

4. In a process of synthesizing branched-chain hydrocarbons of high anti-knock rating boiling in the gasoline range by an alkylation reaction between an olefin and a branched-chain paraffin hydrocarbon, the improvement which comprises conducting the alkylation reaction in the presence of a small amount less than 1% by weight based on hydrocarbons charged of a mixture of butyl amino phenols.

5. In a process of synthesizing branched-chain hydrocarbons of high anti-knock rating boiling in the gasoline range by an alkylation reaction between an olefin and a branched-chain paraffin hydrocarbon, the improvement which comprises conducting the alkylation reaction in the presence of a small amount less than 1% by weight based on hydrocarbons charged of phenol.

6. In a process of synthesizing branched-chain hydrocarbons of high anti-knock rating boiling in the gasoline range by an alkylation reaction in the presence of an alkylation catalyst between an olefin and a branched-chain paraffin hydrocarbon, the improvement which comprises conducting the alkylation reaction in the presence of a small amount less than 1% by weight based on hydrocarbons charged of a mixture of butyl amino phenols.

7. In a process of synthesizing branched-chain hydrocarbons of high anti-knock rating boiling in the gasoline range by an alkylation reaction in the presence of an alkylation catalyst between an olefin and a branched-chain paraffin hydrocarbon, the improvement which comprises conducting the alkylation reaction in the presence of a small amount of less than 1% by weight based on hydrocarbons charged of phenol.

8. In a process of synthesizing branched-chain hydrocarbons of high anti-knock rating boiling in the gasoline range by an alkylation reaction in the presence of concentrated sulfuric acid between di-isobutylene and isobutane, the improvement which comprises conducting the alkylation reaction in the presence of a small amount less than 1% by weight based on hydrocarbons charged of phenol.

9. In a process of synthesizing branched-chain hydrocarbons of high anti-knock rating boiling in the gasoline range by an alkylation reaction in the presence of aluminum chloride between propylene and isobutane, the improvement which comprises conducting the alkylation reaction in the presence of a small amount less than 1% by weight based on hydrocarbons charged of a mixture of butyl amino phenols.

ARLIE A. O'KELLY.
ROBERT H. WORK.
JULIUS PLUCKER, III.

REFERENCES CITED

The following references are of record in the file of this patent:

UNITED STATES PATENTS

| Number | Name | Date |
| --- | --- | --- |
| 2,002,394 | Frey | May 21, 1935 |
| 2,209,450 | Frey et al. | July 30, 1940 |
| 2,322,664 | Russell | June 22, 1943 |
| 2,324,099 | Mason | July 13, 1943 |
| 2,323,616 | McAfee et al. | July 6, 1943 |
| 2,276,251 | Morrell | Mar. 10, 1942 |
| 2,265,548 | Schuit | Dec. 9, 1941 |
| 2,384,294 | Frey | Sept. 4, 1945 |

FOREIGN PATENTS

| Number | Country | Date |
| --- | --- | --- |
| 540,824 | Great Britain | Oct. 31, 1941 |